UNITED STATES PATENT OFFICE.

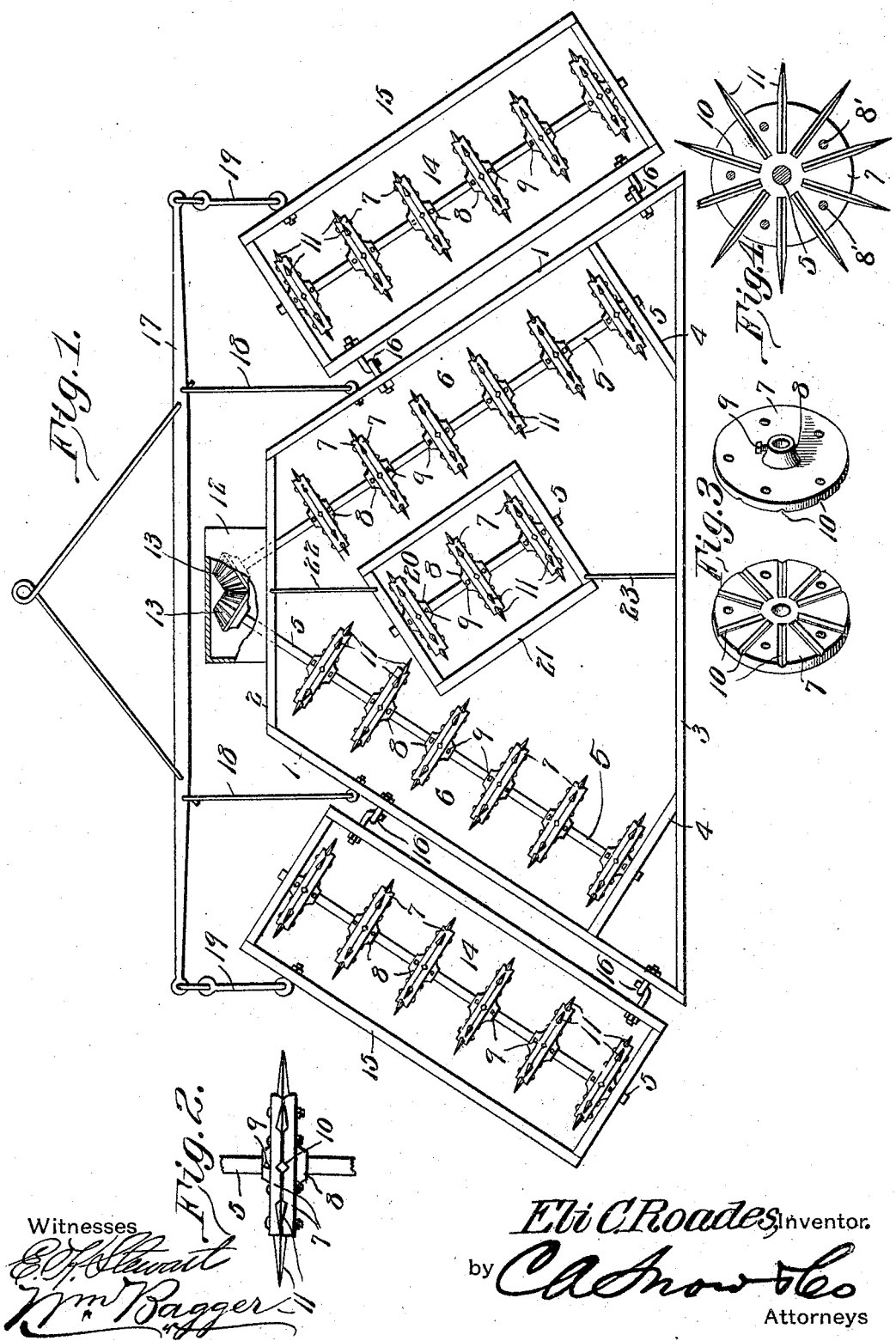

ELI C. ROADES, OF PULSE, OHIO.

HARROW.

No. 802,115.  Specification of Letters Patent.  Patented Oct. 17, 1905.

Application filed August 5, 1905. Serial No. 272,829.

*To all whom it may concern:*

Be it known that I, ELI C. ROADES, a citizen of the United States, residing at Pulse, in the county of Highland and State of Ohio, have invented a new and useful Harrow, of which the following is a specification.

This invention relates to harrows, and especially to that class of harrows in which a plurality of rotary members are supported for rotation in a frame, said rotary members being so disposed that the ground over which the implement is dragged shall be thoroughly pulverized.

The objects of the invention are to simplify and improve the construction and operation of this class of devices; and with these and other ends in view, which will readily appear as the nature of the invention is better understood, the same consists in the improved construction and novel arrangement and combination of parts to be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In said drawings, Figure 1 is a top plan view of a harrow constructed in accordance with the principles of the invention. Fig. 2 is a detail top view, enlarged, of one of the harrow-disks complete. Fig. 3 is a perspective detail showing the two spiked clamping-disks separated from each other, and Fig. 4 is a side view presenting the inner face of one of the disks with the spikes in position.

Corresponding parts in the several figures are indicated throughout by similar characters of reference.

A trapezoidal frame has been shown, including forwardly-converging side members 1 1, connected by a relatively short front piece 2 and a relatively long rear piece 3. Obliquely-disposed braces 4 at angles to the side members 1 connect the latter with the rear piece 3 of the frame, and said braces, together with the front piece 2, afford bearings for the shafts 5 of the main harrow members 6 6. The construction of these harrow members is identical, except as to size, with that of auxiliary harrow members to be hereinafter described, and each of said harrow members includes a plurality of pairs of clamping-disks 7 7, having hubs 8 secured upon the shafts 5, as by means of set-screws 9, the inner sides of said clamping-disks being provided with radial grooves 10 for the reception of the harrow teeth or spikes 11, which latter may be of any desired size or shape and of which any desired number may be used, said teeth or spikes being securely clamped between the disks 7 7 by means of bolts 8', connecting the latter. The pairs of disks may be suitably spaced upon the harrow-shafts 5 to insure the most successful operation under such various conditions as may exist.

The front ends of shafts 5 are extended through oblique bearings into a box or casing 12 upon the front side of the front bar of the frame, said casing being for the protection of intermeshing bevel-pinions 13 upon the front ends of the shafts, the function of which is to cause said shafts when the implement is in operation to rotate evenly and uniformly, thereby making the operation of the machine smooth, regular, and efficient.

Auxiliary harrow members 14, the construction of which is identical with that of the harrow members 6, are supported for rotation in rectangular frames 15, which are hingedly connected, as by links 16, with the forwardly-converging side members of the main frame.

17 is a draft-bar which is disposed in front of the main frame and which is connected, by means of links 18, with the side members of said main frame and by means of links 19 with the outer side members of the auxiliary frames 15. When the auxiliary harrow members 14, mounted in the frames 15, are not used, a shorter draft-bar may obviously be employed.

Another auxiliary harrow member 20 is mounted for rotation in a rectangular frame 21, which is obliquely disposed within the main frame and between the harrow members 6. The frame 21 is obliquely disposed and is connected, by means of links 22 and 23, with the front and rear members of the main frame. When this auxiliary harrow member, which, as will be seen, is considerably shorter than the main harrow members, is employed, it will serve to operate upon the strip of ground intermediate the front ends of the harrow members 6 6. This auxiliary harrow member 20 may also be removed when desired, in which event the main members of the harrow may be utilized for cultivating purposes, the row of plants operated upon being straddled by the harrow members 6 6.

From the foregoing description, taken in connection with the drawings hereto annexed, the operation and advantages of this invention will be readily understood by those skilled in the art to which it appertains. When the harrow is drawn over the ground, the several rotary members will be rotated by contact with the ground, the surface of which will be thoroughly broken and pulverized. When the harrow is to be transported from one place to another, the links 19 will be disconnected from the frames 15, and the latter, with the harrow members 14 supported therein, may be folded upon the sides of the main frame. Runners (not shown) may then be detachably connected with the four corners of the main frame, enabling the latter to be dragged over the ground, while the harrow members remain inactive.

Having thus described the invention, what is claimed is—

1. In a harrow of the class described, a trapezoidal frame, obliquely-disposed braces connecting the side members with the rear member, shafts supported for rotation in said braces and in the front member of the frame said shafts being parallel to the side members of the frame, and spike-supporting clamping-disks secured at intervals upon said shafts.

2. In a harrow of the class described, a harrow-frame having forwardly-converging side members, harrow members supported for rotation parallel to said side members and having shafts extended beyond the front of the frame, a casing upon the front member of the frame, and intermeshing bevel-pinions upon the shafts within the casing.

3. In a harrow of the class described, a trapezoidal frame, harrow members supported for rotation within said frame and parallel to the side members thereof, rectangular frames connected hingedly with the side members of the main frame, harrow members supported for rotation in said rectangular frames, a draft-bar, and links connecting the latter with the side members of the main frame and with the outer side members of the rectangular auxiliary frames.

4. In a harrow of the class described, a trapezoidal frame, obliquely-disposed braces in said frame near the rear corners thereof, harrow-sections supported for rotation in said braces and in the front pieces of the main frame, a rectangular auxiliary frame supported within the main frame between the harrow-sections by means of links connecting said auxiliary frame with the front and rear members of the main frame, and a harrow-section supported for rotation in said auxiliary frame.

In testimony that I claim the foregoing as my own I have hereto affixed my signature in the presence of two witnesses.

ELI C. ROADES.

Witnesses:
J. H. PUGH,
P. G. ROSSELOTT.